United States Patent

[11] 3,612,061

| [72] | Inventors | Carter C. Collins<br>Mill Valley;<br>Robert Bowen, San Bruno, both of Calif. |
|---|---|---|
| [21] | Appl. No. | 800,948 |
| [22] | Filed | Feb. 20, 1969 |
| [45] | Patented | Oct. 12, 1971 |
| [73] | Assignee | The Institute of Medical Sciences<br>San Francisco, Calif. |

[54] FLEXIBLE CUTANEOUS ELECTRODE MATRIX
8 Claims, 5 Drawing Figs.

[52] U.S. Cl...................................................... 128/418,
3/1, 340/407
[51] Int. Cl....................................................... A61n 1/04
[50] Field of Search............................................ 128/404,
411, 416, 418, 379, 384, 2.06; 340/407; 3/1

[56] References Cited
UNITED STATES PATENTS
2,703,344  3/1955  Anderson.................... 128/404

| 1,889,272 | 11/1932 | Zerne...................... | 128/416 |
| 2,493,155 | 1/1950 | McMillan.................. | 128/404 X |
| 3,108,268 | 10/1963 | Uttal......................... | 128/411 X |

FOREIGN PATENTS

| 1,237,702 | 6/1960 | France...................... | 128/2.06 |

*Primary Examiner*—William E. Kamm
*Attorneys*—William D. Hall, Elliott I. Pollock, Fred C. Philpitt, George Vande Sande, Charles F. Steininger and Robert R. Priddy ABSTRACT: A porous sheet of elastic material supports an array of electrodes adapted to contact the wearer's skin. The sheet and electrodes are conformed to the wearer's body configuration by an outer less flexible sheath, interposed resilient material, and adjustable fastening means. The several electrodes are connected to a cable fed with electrical pulses adapted to produce a two-dimensional electrical skin stimulation pattern representing or depicting a visible object.

PATENTED OCT 12 1971 3,612,061

INVENTORS
CARTER C. COLLINS
ROBERT BOWEN

BY

ATTORNEYS

FLEXIBLE CUTANEOUS ELECTRODE MATRIX

CROSS-REFERENCE TO RELATED APPLICATIONS

The cutaneous electrode matrix of the present invention may form a portion of the system disclosed in the copending application of Carter C. Collins Ser. No. 800,909 filed Feb. 19, 1969 for "Tactile Image Projection System."

BACKGROUND OF THE INVENTION

A known therapeutic approach in the treatment of blindness contemplates replacing the lost sense of vision by conveying signals to the brain in an alternative fashion. In searching for an alternative modality to replace vision, it has been found that the integument of a subject is the only organ besides the eye with receptors organized in two dimensions to receive stimuli to be distributed and interpreted in two dimensions of space, with spatial and temporal integrating capability. Based on such considerations, optical images have, in the past, been converted into effective vibrating mechanical replicas which are imposed on the skin of a subject, and then conveyed via the skin receptors to the subject's brain where the vibrating replica is perceived and subsequently conceived as visual information.

Visual substitution systems employing arrays of vibrating tactors tend to be large, heavy, bulky and consume relatively large amounts of power thereby limiting or, in many cases, eliminating mobility of the user of the overall visual substitution system. In an effort to reduce the factors of size, bulk, weight and power consumption which characterize known mechanical stimulator arrangements, it has also been suggested that the desired skin stimulation could be achieved by purely electrical means, i.e., by applying electrical signals directly to the skin of the subject. To the extent that efforts have been made heretofore to implement this alternative suggestion, electrical stimulator constructions of the prior art have still been heavier and bulkier than desirable. Moreover, the forms of electrical stimulators which have been suggested heretofore have been physically rigid in nature, thereby preventing the use of a given universal stimulator structure on different subjects having different body contours which change shape and radii of curvature with movement. Moreover, the prior arrangements have been such that good contact between the electrodes and the skin of a wearer have been achieved at the expense of comfort, and by arrangements which tend to obstruct blood circulation and which may, indeed, reduce the sensitivity of the nerve endings of the skin adjacent the electrodes.

The present invention relates to a garment structure adapted to obviate the above problems, as well as other problems which will become apparent from the subsequent description; and provides a cutaneous interface which is light in weight, comfortable to wear over long periods of time, relatively inconspicuous when worn, and highly efficient in operation.

SUMMARY OF THE INVENTION

In accordance with the present invention, a flexible electrocutaneous interface comprises a portion of a standard garment such as a shirt or vest, or a separate garment adapted to be worn under conventional garments. The interface includes an inner flexible or elastic member of porous sheet configuration adapted to support an array of electrodes. The electrodes may take various configurations to be described, and preferably comprise, in essence, electrodes of the coaxial type comprising an outer electrode portion adapted to be grounded, and an inner electrode portion spaced or otherwise insulated from said outer portion and adapted to be fed with electrical signals.

The electrode array is caused to conform closely to the body contours of a wearer by means of resilient backing material in engagement therewith, cooperating with an outer relatively tough elastic sheath. The several electrodes in the array are connected by flexible conductors to a cable which may be supplied with electrical signals from an artificial receptor and an associated signal conversion circuit.

DESCRIPTION OF THE PREFERRED EMBODIMENTS

Figure 1:
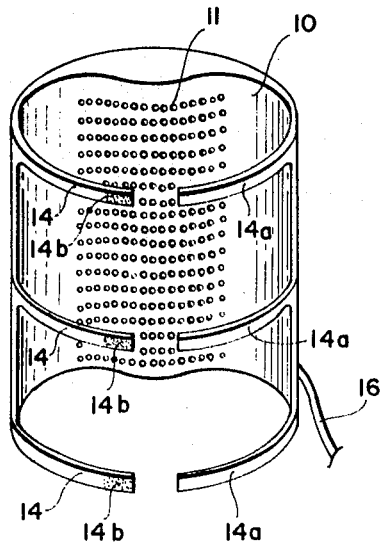
FIG. 1 is an illustrative perspective view of one form of flexible cutaneous interface constructed in accordance with the present invention.

The present invention comprises a garment adapted to be worn by a blind subject, or by a sighted individual desiring a separate visual input other than the eyes, and is intended to cooperate with appropriate external equipment forming a visual substitution system or tactile television system. The external equipment, which does not per se form a portion of the present invention, may comprise an artificial receptor such as a small TV camera and associated circuitry adapted to convert visual or pictorial information into electrical signals; and these electrical signals must be distributed to discrete skin loci for purposes of electrically stimulating the surface of the skin thereby to project and impress tactile information upon the skin receptors of the subject. The image formed on the skin receptors and perceived at the receptor level is then conducted via peripheral nerves to the subject's brain where the original visible image is reconstructed.

The skin receptor network and central nervous system are adaptable or "plastic" in their ability to interpret, as visual pictures, electrical images projected onto the surface of the skin. Moreover, transfer of learning from one area of the body to another occurs, i.e., a subject who trains with images projected onto the skin of his back will subsequently appreciate and be able to interpret electrical images effected by stimulation occurring on the subject's fingertips, chest, scalp or other parts of the body. This indicates that the learning process of interpreting spatially distributed image information projected onto the skin occurs at the level of the central nervous system, and is not learned for a specific skin area of the body but is a general concept manifest at the central level. Spatial acuity, resolving power, or resolution capability of the skin for electrical image detail has, moreover, been found to improve with training and practice.

The present invention provides a highly improved cutaneous electrode matrix intended to engage and maintain engagement with the compound curvature of the skin of the back of a subject. As such, it can be used as a training aid permitting the subject to later interpret information applied to some other portion of the body or, in the alternative, it may be used as the cutaneous interface forming a portion of an operational electrical image projection system intended to use the skin receptor network of the subject's back as the receptor area.

The arrangement of the present invention comprises, in essence, a matrix or array of stimulator electrodes mounted in or on a garmentlike supporting structure adapted to achieve and maintain comfortable, continuous surface contact of all the electrodes with the skin of the subject. To this effect, the overall structure comprises a garment in the nature of a backpack or flexible sheet which may form a portion of a conventional garment such as a shirt, coat, sweater, vest, harness or the like. In the form shown in the drawings, the backpack is depicted as a separate garment to be worn under conventional garments and in direct engagement with the skin of the subject.

Figure 2:
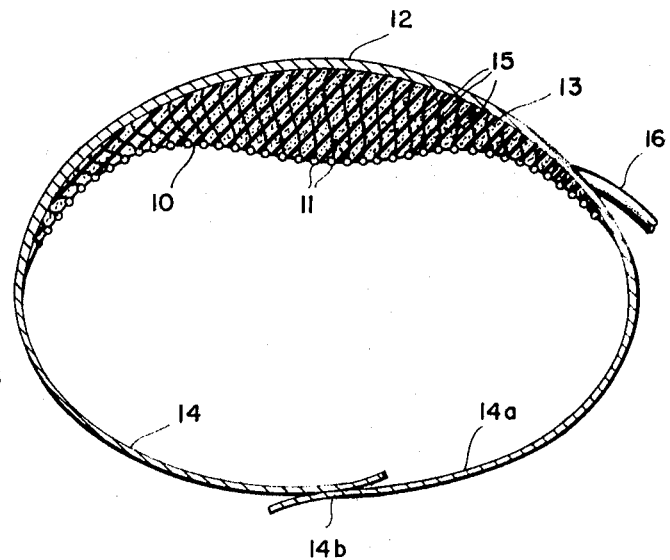
FIG. 2 is a cross section of an interface structure of the type shown in FIG. 1.

The backpack shown in FIGS. 1 and 2 comprises an inner flexible or elastic membrane or sheet 10 adapted to contact the wearer's skin and maintain contact even with large amplitude movements. The material of membrane 10 may (as will become more readily apparent from the discussion of FIGS. 3A–3C) comprise either an electrically conductive or an electrically insulating material. In either case, however, membrane 10 should be porous in nature so as to allow the skin to breathe, perspire, expand, and move freely thereby to achieve maximum comfort when the overall garment is being worn.

Membrane 10 supports a plurality of electrodes 11 in a multiple row matrix or array wherein the electrodes are arranged preferably in either a square cartesian coordinate system, or in a hexagonal honeycomblike packing structure. While the array of electrodes 11 is illustrated in FIG. 1 as being disposed primarily adjacent to the back of the subject, this is not mandatory and, as partially illustrated in FIG. 2, the array may be so disposed as to extend around to the sides of the wearer and even onto the front of the wearer's chest, to his limbs, neck, buttocks or other surface of the body.

The electrode spacing between the several electrodes 11 may be maintained at a relatively uniform distance or spaced at intervals matching the two point limen or spatial acuity of the skin; this is not critical. Electrode spacings on the back between one-quarter and one-half inch have proven satisfactory. Closer spacing can be resolved on other body areas. Moreover, it is not necessary that the electrodes remain in the same location on the skin at all times. The electrodes may shift relative to one another and relative to the skin; and the electrically stimulated images are still conveyed to the subject without detriment. It is not the specific location of stimulation which is important, but the maintenance of the correct interrelationship of various areas within the image being stimulated, by means of an array of electrodes which assures the necessary image transmission. It is most important, however, to assure that sufficient electrode backing pressure is maintained in order to assure that all of the electrodes engage the skin and remain in engagement with the skin during normal body movements; and this result must be achieved without excessive contact pressure since excessive pressure will tend to exsanguinate an area producing local ischemia which can reduce the sensitivity of the nerve endings of the skin in this region. Moreover, the electrodes 11 should be fabricated in a smooth configuration, where they engage the skin, and should be fabricated of a nonirritating material.

In order to achieve the desired pressure of the electrodes on the skin, comfort, and good conformation of the electrode array to the body configuration of various different wearers, the overall garment is provided with an external tough sheath 12 of elastic material substantially coextensive with membrane 10 but having less compliance than that of membrane 10. The outermost edges of membrane 10 are joined (e.g., stitched and/or glued) to sheath 12, and the region between membrane 10 and sheath 12 is filled with a resilient material 13 which may comprise a foamed elastometric plastic material, or an inflatable air cushion. The resilient material 13 should be freely permeable to air in order to maintain wearing comfort. When an elastic foamed plastic material with communicating air passages is employed, such permeability is readily achieved. If the material 13 takes the form of an inflatable structure, however, it should preferably be formed as a plurality of separately inflated members having air or communicating foam spaces or apertures therebetween for air circulation.

In order to effect close contact between the electrode array and the various compound curvatures of a wearer's body, sheath 12 is provided with extensions comprising, for example, a plurality of elastic chest straps 14, 14a adapted to extend around the sides and to the front of the wearer, and provided with adjustable fasteners such as Velcro fasteners 14b. Three such sets of straps 14, 14a are shown in the embodiment of FIG. 1; but more than three such strap sets may be utilized to adjust the overall garment into good contact over the entire broad surface of the back. In the alternative, rather than providing separate straps, the entire garment can extend around to the front of the wearer's body in a vestlike configuration, and such a garment may be provided with an appropriate extended adjustable fastener, e.g., in the nature of a Velcro "zipper." Other closure arrangements and adjustable fasteners will be apparent to those skilled in the art.

When straps 14, 14a, or their equivalent, are fastened together, resilient material 13, by pushing against outer sheath 12, urges inner sheet or membrane 10 into close conformity with the wearer's body. This conformity is achieved regardless of the particular body configuration of an individual wearer, and is maintained with comfort even though the wearer should move or flex the body surface in engagement with electrodes 11.

The several electrodes 11 are associated individually with flexible conductors 15 which extend through resilient material 13 to outer sheath 12 where they are gathered together into a cable 16 extending outwardly from the garment. Each of the conductors or leads 15 should have sufficient length and flexibility to permit significant dimensional variations between inner and outer members 10 and 12 of the garment without causing undue flexing, kinking, or mechanical stress on said conductors. Cable 16 is, of course, connected to the external receptor and associated circuitry for supply of electrical signals to the various electrodes 11.

Electrodes 11 are preferably of the coaxial type, comprising an outer electrode portion of relatively large surface area formed as a separate annular electrode portion or as part of sheet 10; and said outer electrode portion is intended to be grounded. Due to the fact that the outer annular electrode portion is of relatively large area, it enjoys a high probability of being in contact with the skin over most of its surface, and therefore permits a relatively large latitude of contact pressure. The outer electrode portion is further associated with an inner or central electrode freely spaced from said outer portion or otherwise insulated therefrom. The central electrode is of relatively small area, and good contact with the skin is therefore essential. The central electrode may be mounted flush with the surface of membrane 10 in contact with the wearer's skin; or alternatively, the inner electrode may extend or protrude outwardly from the innermost surface of membrane 10 by as much as one-sixteenth of an inch or so. In order to minimize possible shock hazards, alternate ones of the electrodes 11 can be energized with opposite polarity, i.e., 180° out of phase.

Figure 3A:
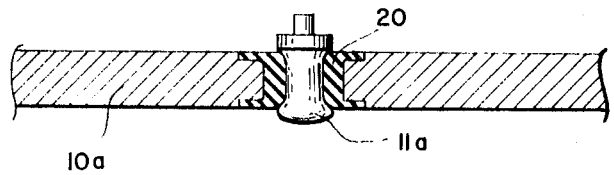
FIGS. 3A, 3B, and 3C are detail views of some of the various electrode arrangements which can be employed in the structure of FIGS. 1 and 2.

FIG. 3A shows one possible electrode configuration constructed in accordance with the present invention. The membrane 10 is here designated 10a, and may comprise a perforated conductive rubber sheet, or some alternative porous conductive flexible material, adapted to be grounded. Sheet 10a is provided with an array of apertures with each aperture receiving an insulating grommet 20; and a conductive rivet 11a is supported in place by each insulating grommet 20 as illustrated. The innermost end of each rivet or electrode 11a is smoothly rounded as illustrated, and protrudes from backing material 10a. Backing material 10a acts as the outer electrode portion, while rivet 11a acts as the inner electrode portion; and these two electrode portions are insulated from and spaced from one another by grommet 20 to provide the coaxial arrangement desired.

Figure 3B:
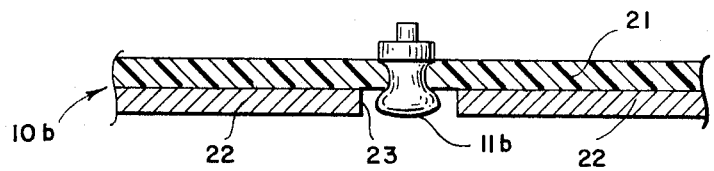

An alternative electrode configuration is shown in FIG. 3B. Membrane or sheet 10 is here designated 10b and is of laminated or stitched configuration comprising a supporting layer 21 of insulating material, and a conductive layer 22. Layer 22 may be fabricated of conductive rubber, conductive plastic, conducting fabric, or may comprise a conductive film or deposit of appropriate composition on layer 21. Layer 22 is provided with an array of recesses 23; and each such recess receives an electrode such as 11b which is supported in place by backing sheet 21. The relative dimensions of electrode 11b and recesses 23 are such that the electrodes 11b are freely spaced from conductive layer 22 so as to achieve the desired coaxial configuration. This free space may be filled with insulating material to prevent dirt and grease entrapment.

Figure 3C:
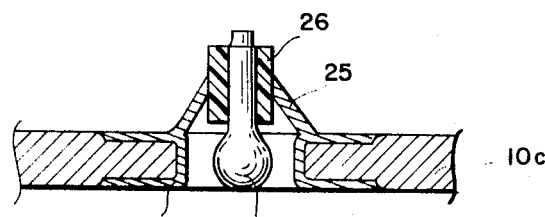

A still further embodiment is illustrated in FIG. 3C. Membrane 10 is here designated 10c and is provided with a plurality of conductive rings such as 24 which are clamped or crimped into membrane 10c. Each ring 24 includes a supporting flange 25 carrying an insulated sleeve 26 through which electrode 11c extends; and the dimensions of electrode 11c and the inner diameter of each ring 24 are such that the two are freely spaced from one another, and are held in spaced apart insulated relation to one another by sleeve 26. This space may be filled with flexible insulation to avoid conducting dirt and grease buildup. Membrane 10c may comprise a conductive material serving to electrically interconnect the various rings 24; or, in the alternative, membrane 10c may be nonconductive material, in which case the several rings 24 may be electrically interconnected by separate electrical connectors.

Combinations of the various arrangements shown may also be utilized. For example, the arrangement may comprise conductive rings, such as rings 24 in FIG. 3C, which grip the membrane and which, in turn, surround and hold in place an insulating grommet and electrode of the type designated 20 and 11a in FIG. 3A. Moreover, the electrode can take other configurations, and may comprise, for example, conductive velcro material.

In the embodiment of FIGS. 3B and 3C the innermost end of each electrode 11b and 11c is substantially flush with the innermost surface of membrane 10b and 10c respectively; but it will be appreciated that electrodes 11b and 11c may be caused to protrude outwardly in the manner already described in reference to FIG. 3A. By the same token, the arrangement of FIG. 3A can be revised to achieve a flush configuration similar to that shown in FIG. 3B and 3C.

While we have thus described preferred embodiments of the present invention, many variations will be suggested to those skilled in the art. For example, while the garment has been described as adapted to contact the skin of a subject's back, the structure may, by appropriate dimensional changes, be adapted for wearing in contact with some other skin area of the subject. It must therefore be understood that the foregoing description is intended to be illustrative only and not limitative of our invention, and all such variations and modifications as are in accord with the principles described are meant to fall within the scope of the appended claims.

Having thus described our invention, we claim:

1. An electrode matrix for pressure contact with a portion of a subject's skin surface, comprising a flexible membrane formed from an electrically conductive material and defining a plurality of apertures, a multirow array of coaxial electrodes supported by said membrane for impressing stimuli corresponding to an image of a visible object to the subject's skin, said electrically conductive material adapted to be grounded and said electrodes adapted to be supplied with electrical signals, insulating support means for electrically insulating each of said electrodes from said electrically conductive material, a flexible backing sheath substantially coextensive with and spaced from said membrane, resilient material interposed between said flexible membrane and said backing sheath, conductor means for coupling electrical signals to said electrodes in said array, said flexible membrane, electrodes, and resilient material conforming to the compound curvature of the subject's skin surface to attain continual skin contact between said electrode matrix and the skin surface, and adjustable fastening means for holding said membrane and electrode array in contact with the skin surface of the subject.

2. The electrode matrix of claim 1 wherein said flexible membrane comprises a sheet of insulating material having said electrically conductive material attached thereto and wherein said insulating material serves as said insulating support means.

3. The electrode matrix of claim 2 wherein said electrically conductive material comprises a conductive layer laminated to said sheet of insulating material.

4. The electrode matrix of claim 2 wherein said electrically conductive material comprises a plurality of conductive rings affixed to said membrane and bounding said apertures respectively.

5. The electrode matrix of claim 1 wherein said backing sheath comprises a material having less compliance than the material comprising said membrane.

6. The electrode matrix of claim 1 wherein said adjustable fastening means comprises a lateral extension of said flexible backing sheath.

7. The electrode matrix of claim 6 wherein said lateral extension comprises a plurality of spaced straps.

8. The electrode matrix of claim 1 wherein said conductor means comprise a plurality of spaced leads extending respectively from said array of electrodes toward said backing sheath, and cable means bundling together said flexible leads and extending said leads in bundled form to a location external of said backing sheath.